No. 720,364. PATENTED FEB. 10, 1903.
A. LEVY.
APPARATUS FOR MOISTENING AIR.
APPLICATION FILED MAY 5, 1902.
NO MODEL.
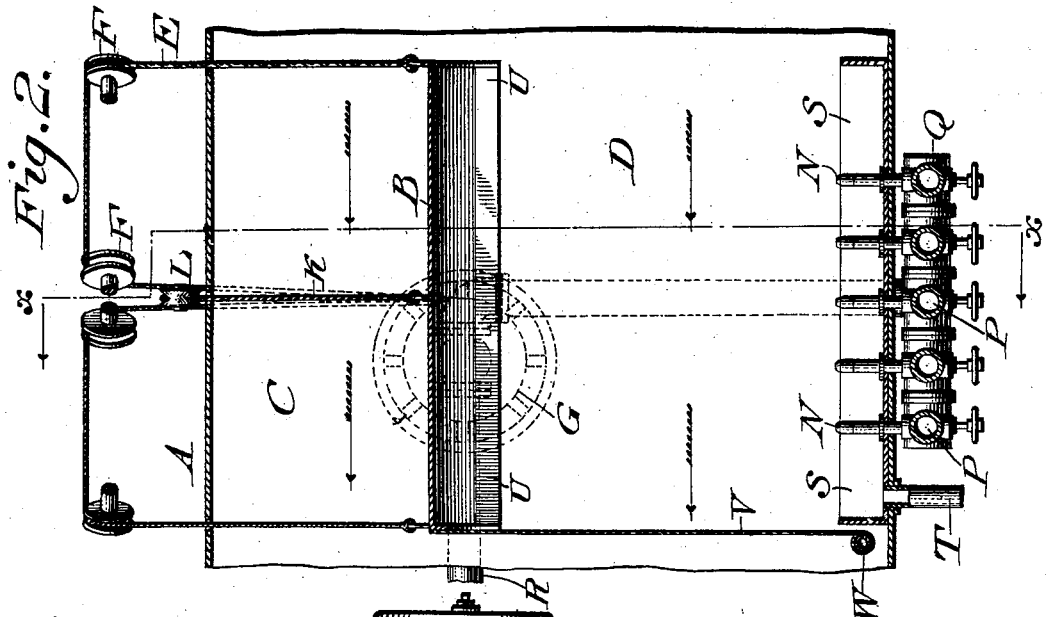
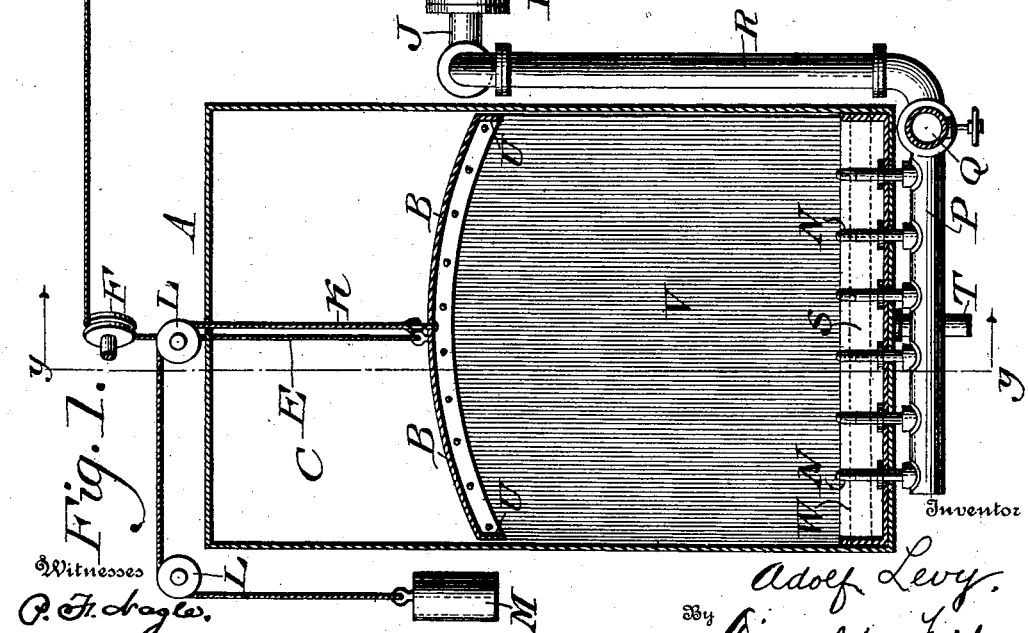

UNITED STATES PATENT OFFICE.

ADOLF LEVY, OF PHILADELPHIA, PENNSYLVANIA.

APPARATUS FOR MOISTENING AIR.

SPECIFICATION forming part of Letters Patent No. 720,364, dated February 10, 1903.

Application filed May 5, 1902. Serial No. 105,893. (No model.)

*To all whom it may concern:*

Be it known that I, ADOLF LEVY, a subject of the Emperor of Germany, residing in the city and county of Philadelphia, State of Pennsylvania, have invented a new and useful Improvement in Apparatus for Moistening Air, of which the following is a specification.

My invention consists of improvements in an apparatus for moistening air, as will be hereinafter fully described and claimed.

Figure 1 represents a vertical transverse section of an air-moistening apparatus constructed in accordance with my invention and taken on the line $x\ x$ of Fig. 2. Fig. 2 represents a longitudinal section thereof, taken on the line $y\ y$ of Fig. 1.

Similar letters of reference indicate corresponding parts in the figures.

Referring to the drawings, A designates an air-conduit, which may lead from an air-heater or may be merely a ventilating-conduit, it being understood that my moistening apparatus is not confined to the moistening of heated air. It is further understood that although I have shown the conduit rectangular in cross-section it may be of any desired shape. The said conduit is divided longitudinally for a portion of its length, and means are provided for supplying a moistening fluid to one of said divisions. The moistening fluid may be water, steam, or water and steam combined, and although in the following specification I will describe the apparatus as arranged for moistening the air by spraying water thereinto it will be understood that my invention is not confined to such specific embodiment. In this way I am enabled to regulate the degree of humidity of the air delivered by the conduit with great certainty. By dividing the conduit longitudinally for a portion of its length and by spraying or admitting water into only one of these divisions I am enabled to supply a sufficient quantity to saturate the atmosphere passing therethrough, and by regulating the proportionate areas of the two divisions I can regulate the volumes of moistened and unmoistened air, which join after passing this divided portion of the conduit, and thus obtain with great certainty the degree of humidity desired. To do this, I provide means for varying the area of the divisions of the conduit, and in the instance illustrated have employed a movable diaphragm or partition B, conveniently dividing the conduit into the upper division C and the lower division D. This partition is conveniently suspended by the ropes or cables E, secured to its ends and passing upwardly through the top of the conduit and over the guide-pulleys F to the drum G, mounted upon the stem H of the valve J. Although I have shown the ropes or cables E thus connected with the valve-stem, it will be understood that they can be operated independent thereof. Secured about midway between the ends of the diaphragm or partition B is another rope or cable K, passing upwardly through the top of the conduit and over the guide-pulleys L and having a counterbalance-weight M connected therewith. On the lower side of the diaphragm or partition B are the devices for supplying water, the same consisting of a plurality of nozzles N in the bottom of the conduit, which are supplied by the pipes P, the latter leading from a pipe Q, which communicates with the pipe R, in which is placed the valve J. This valve J is provided with a rotatable stem, although it is understood that other forms of valves may be employed. The pan S is situated in the bottom of the conduit below the diaphragm or partition B to receive the drippings from the latter and is provided with an outlet T. The diaphragm or partition B is conveniently curved and is provided at its edges with flanges U.

Secured to the end of the diaphragm or partition B adjacent the delivery end of the conduit is a curtain V, conveniently of cloth, that is secured at its lower end to a self-winding spring-roller W, so that as the diaphragm or partition is raised and lowered the curtain is unwound or wound upon said roller W. This curtain forms a partition between the end of the division of the conduit to which the water is supplied and the remaining portion of the conduit, and its function is to prevent the water being carried away from this division and into the other portions of the conduit. Although I have shown it at the delivery end of the division, yet it may be placed at both ends, and instead of being secured to the diaphragm or partition B it may be stationary and be secured to the walls of the conduit and extend across the entire conduit at one or both ends of the divided portion. When thus extending across the entire conduit, it serves not only to prevent the water from leaving the divided portion, but it also serves to filter the air.

The operation is as follows: Although I have shown the device for raising and lowering the diaphragm connected with and controlled by the valve-stem, it will be understood that these parts may be operated independently, although it is convenient to have them operated by common means. As the water is turned on the position of the diaphragm or partition is changed, being raised to increase the capacity of the lower division and reduce the capacity of the upper division as the water-supply increases. I contemplate supplying sufficient water to the lower division to saturate the air passing therethrough, and thus by varying the areas of the divisions of the conduit and by maintaining the air passing through the lower division in the saturated state I am enabled to secure with great certainty the desired degree of humidity of the atmosphere as it is delivered by this conduit.

Having thus described my invention, what I claim as new, and desire to secure by Letters Patent, is—

1. A device for regulating the moistening of air, consisting of a conduit divided longitudinally by movable means for a portion of its length, whereby the column of air passing therethrough is first divided and then recommingled, and means for supplying a moistening fluid to one of the divisions.

2. A device for regulating the moistening of air, consisting of a conduit divided longitudinally by movable means for a portion of its length, whereby the column of air passing therethrough is first divided and then recommingled, and means for spraying a liquid into one of the divisions.

3. A device for regulating the moistening of air, consisting of a conduit divided longitudinally by movable means for a portion of its length, whereby the column of air passing therethrough is first divided and then recommingled, said movable means being adapted for varying the area of the divisions of said conduit, and means for supplying a moistening fluid to one of said divisions.

4. A conduit divided longitudinally for a portion of its length, means for varying the area of the divisions of said conduit, means for supplying a moistening fluid to one of said divisions, and means for simultaneously regulating said fluid-supply and for varying the area of said divisions.

5. A device for regulating the moistening of air, consisting of a conduit having a movable diaphragm or partition longitudinally arranged between the ends thereof, whereby the column of air passing through the conduit is first divided and then recommingled, and means for supplying a moistening fluid to said conduit on one side of said diaphragm or partition.

6. A device for regulating the moistening of air, consisting of a conduit having a movable diaphragm or partition longitudinally arranged between the ends thereof, whereby the column of air passing through the conduit is first divided and then recommingled, means for supplying a moistening fluid to said conduit on one side of said diaphragm or partition, and means for regulating the fluid-supply.

7. A conduit having a movable diaphragm or partition longitudinally arranged, means for supplying a moistening fluid to said conduit on one side of said diaphragm or partition, and common means for regulating said fluid-supply and moving said diaphragm or partition.

8. A conduit having a movable diaphragm or partition longitudinally arranged, means for supplying a moistening fluid to said conduit on one side of said diaphragm or partition, means for regulating said fluid-supply connected with said diaphragm, whereby said parts are operated in unison.

9. A conduit having a movable diaphragm or partition consisting of a freely-suspended longitudinal plate, means for supplying a moistening fluid to said conduit on one side of said diaphragm or partition, and means for regulating said fluid-supply connected with said diaphragm, whereby the latter is moved when the fluid-supply is regulated.

10. A conduit having a freely-suspended longitudinal plate, situated therein and connected with a counterbalancing-weight, means for supplying a moistening fluid to said conduit, and a valve controlling said moistening-fluid supply and connected with said plate.

11. A conduit divided longitudinally for a portion of its length, means for increasing the area of one of the divisions and correspondingly decreasing the area of the other, and means for supplying a moistening fluid to one of said divisions.

12. A conduit divided longitudinally by a movable diaphragm or partition longitudinally arranged, means for supplying a moistening fluid to said conduit on one side of said diaphragm or partition, and a partition between the end of the division to which the moistening fluid is supplied and the other portions of the conduit.

ADOLF LEVY.

Witnesses:
JOHN A. WIEDERSHEIM,
HARRY COBB KENNEDY.